United States Patent
Krewer et al.

(10) Patent No.: US 9,975,138 B2
(45) Date of Patent: May 22, 2018

(54) INSERTION OF NOZZLE IN PIPING BAG

(71) Applicant: Kee Plastics AB, Norrkoping (SE)

(72) Inventors: Lars Krewer, Uddevalla (SE); Ebbe Persson, Uddevalla (SE)

(73) Assignee: Kee Plastics AB, Norrkoping (SE)

( * ) Notice: Subject to any disclaimer, the term of this patent is extended or adjusted under 35 U.S.C. 154(b) by 591 days.

(21) Appl. No.: 14/593,598

(22) Filed: Jan. 9, 2015

(65) Prior Publication Data

US 2015/0196931 A1    Jul. 16, 2015

(30) Foreign Application Priority Data

Jan. 13, 2014  (SE) ...................... 1450024

(51) Int. Cl.
  *B05C 17/005*  (2006.01)
  *A21C 15/00*  (2006.01)
  *B65B 7/02*  (2006.01)
  *B65B 39/00*  (2006.01)

(52) U.S. Cl.
  CPC ...... *B05C 17/00506* (2013.01); *A21C 15/005* (2013.01); *B65B 7/02* (2013.01); *B65B 39/00* (2013.01); *Y10T 29/49826* (2015.01)

(58) Field of Classification Search
  CPC ...... B25J 1/04; B25J 11/0045; B25J 15/0038; B25J 15/0042; B25J 15/0047; Y10T 29/54; Y10T 29/537; Y10T 29/53909
  USPC .............. 29/237, 235, 238, 243.55
  See application file for complete search history.

(56) References Cited

U.S. PATENT DOCUMENTS

| 4,401,214 A | * | 8/1983 | Kleckers | B65D 81/3266 |
| | | | | 206/219 |
| 5,419,030 A | * | 5/1995 | Szymberski | B25B 27/28 |
| | | | | 29/235 |
| 2003/0091702 A1 | | 5/2003 | Folkmar | |

FOREIGN PATENT DOCUMENTS

| DE | 23 59 677 A1 | 6/1975 |
| EP | 0 757 006 B1 | 12/1999 |
| EP | 1 598 281 A1 | 11/2005 |
| WO | 2007081272 A1 | 7/2007 |
| WO | 2010054692 A1 | 5/2010 |
| WO | 2011126453 A1 | 10/2011 |
| WO | 2012/060771 A1 | 5/2012 |
| WO | 2012060771 A1 | 5/2012 |

(Continued)

OTHER PUBLICATIONS

Extended European Search Report for European patent application 15150862.9 dated May 20, 2015.

*Primary Examiner* — Jason L Vaughan
*Assistant Examiner* — Amanda Meneghini
(74) *Attorney, Agent, or Firm* — Olive Law Group, PLLC (57) ABSTRACT

A method for fitting a piping nozzle (1) or a part of a piping nozzle (1) in a piping bag (2) comprises placing the piping nozzle (1) in an initial position (3), which initial position (3) is situated at a substantial distance from a piping position (5) located in the piping bag (2), using a piping nozzle applicator (4), which is movable between the initial position (3) and the piping position (5), to releasably engage with the piping nozzle (1) at the initial position (3), using the piping nozzle applicator (4) to bring the piping nozzle (1) from the initial position (3) substantially to the piping position (5) in the piping bag (2), releasing the piping nozzle (1) from the piping nozzle applicator (4) at the piping position (5), and pulling the piping nozzle applicator (4) back from the piping position (5).

9 Claims, 5 Drawing Sheets

(56) References Cited

FOREIGN PATENT DOCUMENTS

WO    WO 2012060771 A1 *  5/2012  ........... A21C 15/005

* cited by examiner

INSERTION OF NOZZLE IN PIPING BAG

CROSS REFERENCE TO RELATED APPLICATION

This application claims priority to and the benefit of Swedish Patent Application No. 1450024-3, filed Jan. 13, 2014 and titled INSERTION OF NOZZLE IN PIPING BAG, the content of which is hereby incorporated by reference herein in its entirety.

TECHNICAL FIELD

The present invention relates to a method for fitting a piping nozzle in a predetermined position and orientation in a piping bag, and to a device for fitting a piping nozzle in a piping bag.

BACKGROUND OF THE INVENTION

When piping a pipeable substance, for example in order to decorate a pastry or garnish another food product, it is known to use a piping nozzle which is fitted on a piping bag. The pipeable substance can, for example, be whipped cream, jam, cream, icing, dough, marzipan, mayonnaise, mousse, sugar paste, purée (potato, apple, etc.), various types of salads with a mayonnaise or créme-fraiche base, such as prawn salad, potato salad or the like, or another viscous and therefore pipeable food product. The invention can also be applied to other materials, such as glue, concrete, caulking compound, lubricant (fat), sealant or the like.

A piping bag can also be filled with less viscous food products, for example when a piping nozzle mounted on the piping bag is provided with means for resealing it. The piping bag can then be used as a refill bag, for example for mustard, ketchup, glue, soap, shampoo, etc.

The traditional method of fitting a piping nozzle for a piping bag is to cut out a small hole at the tip of the piping bag and to insert a male part of a piping nozzle through the large filling opening of the piping bag and, from inside the bag, push the nozzle out through the cut-open hole. The piping nozzle, which often has a conical portion, has a maximum diameter greater than the hole that is cut out. The piping nozzle is thereby locked in the hole. However, this method requires that the bag is empty in order for the piping nozzle to be able to be fitted smoothly and easily.

Piping nozzles of this type are simple and handy to use.

However, this known technique does not function satisfactorily in what are called "pre-filled piping bags", i.e. piping bags that are filled with the piping substance before the piping nozzle is fitted. Pre-filled piping bags, which are completely sealed, are delivered to the user who, before using them, opens the piping bag and dispenses the content.

It is known from EP 0 757 006 B1 to produce pre-filled piping bags in which a male part of a piping nozzle is inserted into the piping bag as the latter is being filled with pipeable substance, in which case, when the piping bag is to be used, the user applies a female part to the male part and in so doing breaks the seal of the piping bag.

A problem with such pre-filled piping bags, which comprise a male part of the piping nozzle, is that the piping nozzle, during its insertion into the piping bag, can end up in the wrong place in the bag, or in an undesired orientation in the bag. In these cases, it may be time-consuming for the user to bring the piping nozzle to the correct position or turn it to the correct orientation. Manipulation of the piping nozzle in the pre-filled piping bag also entails a risk of the piping bag tearing or splitting open at an undesired place.

WO 2012/060771 A1 discloses a method and a device for fitting a piping nozzle in a piping bag with the aid of the pipeable substance during the filling of the piping bag.

Even with this method, however, there may still be the problem of ensuring that the piping nozzle reaches and remains in the correct position and correct orientation in the piping bag.

EP 1 598 281 A1, the entire content of which is incorporated in the present document by reference, discloses a piping bag which is suitable for being pre-filled with pipeable substance and then sealed.

There is a need for a device or method that can ensure that the piping nozzle ends up in the correct position and correct orientation in the piping bag before the filling of the piping bag and that it also remains in this position during the filling of the piping bag and during the piping with the piping bag.

SUMMARY

A general aim is therefore to make available a method and a device that eliminate or mitigate the disadvantages of the prior art. A specific aim is to make available a method and a device that allow a piping nozzle to be placed in a correct position and correct orientation in a piping bag before the latter is filled.

The invention is defined by the attached independent patent claims. Embodiments are set forth in the dependent patent claims, in the description below and in the drawings.

According to a first aspect, a method is made available for fitting a piping nozzle or a part of a piping nozzle in a piping bag by placing the piping nozzle in an initial position, which initial position is situated at a substantial distance from a piping position located in the piping bag, using a piping nozzle applicator, which is movable between the initial position and the piping position, to releasably engage with the piping nozzle at the initial position, using the piping nozzle applicator to bring a piping nozzle from the initial position substantially to the piping position in the piping bag, releasing the piping nozzle from the piping nozzle applicator at the piping position, and pulling the piping nozzle applicator back from the piping position or withdrawing the piping bag from the piping nozzle applicator.

Here, "piping nozzle" means either a complete piping nozzle or a piping nozzle that needs to be provided, for example, with a female part that gives a desired cross-sectional shape to the substance piped with the piping bag, and possibly also a fixing part. Of course, the fixing part and the female part can be integrated with each other, for example by being configured in one piece.

Here, "piping position" means a position in the piping bag from which, during use, piping substance leaves the piping bag through the piping nozzle.

A "substantial distance" means a distance that exceeds a greatest dimension of the piping nozzle.

The piping nozzle being brought "substantially to the piping position" means that the piping nozzle applicator stops at most 2-3 cm from the piping position and at least brings the piping nozzle so close to the piping position that the piping nozzle cannot be turned or moved and cannot take up the wrong orientation when the piping bag is filled with pipeable substance.

When the piping nozzle reaches the piping position, the piping nozzle is wedged securely against walls of the piping bag and is then located in a desired position and orientation for piping, and it is then released from the piping nozzle applicator.

The piping nozzle can be released from the piping nozzle applicator by the effect of friction, which arises between the piping nozzle and the piping bag in the piping position, or by a shape effect.

For example, the piping nozzle can be provided with barbs which ensure that, when the piping nozzle reaches the piping position, it does not follow the piping nozzle applicator when the latter is pulled back from the piping position.

An outer part of the piping nozzle applicator can function as an abutment for the piping nozzle when the piping nozzle applicator is pulled back.

The method provides a simple and reliable way of ensuring that the piping nozzle reaches a desired position and orientation in the piping bag. The piping nozzle applicator can engage with the piping nozzle sufficiently firmly to prevent the latter from accidentally coming loose from the piping nozzle applicator during transport from the initial position to the piping position in the bag.

The piping nozzle applicator can, for example, engage with the piping nozzle by means of a resilient member, an expandable part, grip claws, a vacuum, or a friction-enhanced surface of the piping nozzle applicator.

The method can further comprise the step of filling the piping bag with pipeable substance and sealing the piping bag.

Filing of the piping bag with pipeable substance may comprise feeding pipeable substance to the piping bag by means of the piping nozzle applicator, preferably after the piping nozzle has been released from the piping nozzle applicator substantially at the piping position.

A piping nozzle at the initial position can be oriented relative to the piping nozzle applicator such that an inlet of the piping nozzle is directed towards the piping nozzle applicator.

The piping nozzle applicator can be movable between the initial position and the piping position in a direction that is parallel to an axial direction of the piping nozzle at the piping position.

The initial position can be located outside the piping bag.

Alternatively, the initial position can be located in the piping bag between a portion of the piping bag, where it is open for filling, and the piping position.

According to a second aspect, a device is made available for fitting a piping nozzle or a part of a piping nozzle in a piping bag, comprising a piping nozzle applicator, which is movable between an initial position and a final position. The piping nozzle applicator is designed for releasable engagement with the piping nozzle in the initial position and is also designed to bring the piping nozzle from the initial position substantially to a piping position in a piping bag and, at the piping position, to release the piping nozzle from the piping nozzle applicator, which piping position coincides with said final position of the piping nozzle applicator.

The piping nozzle applicator can be an elongate member which, at one end, is provided with means for releasably engaging with a piping nozzle.

The elongate member can be a lance, a spear, a rod or the like.

The means for engaging with a piping nozzle in a releasable manner is chosen from a group including a resilient member, an expandable part, grip claws, protrusions, ridges, depressions or grooves provided around an inside or outside of the piping nozzle applicator a vacuum, or a friction-enhanced surface of the piping nozzle applicator.

A friction-enhanced surface of the pipe nozzle applicator can be the result of a surface structure, an adhesive surface layer, etc.

The piping nozzle applicator can be movable between an initial position and a final position along its longitudinal direction.

The longitudinal direction of the piping nozzle applicator can be substantially parallel to a longitudinal axis of the piping nozzle when the piping nozzle is located in the initial position in the piping bag.

Substantially parallel means that the angle between the longitudinal direction of the piping nozzle applicator and the longitudinal axis of the piping nozzle is a maximum of 25, 20, 15, 10, 5 or 0 degrees.

The piping nozzle applicator can be movable between the initial position and the piping position in a direction that is substantially parallel to an axial direction of the piping nozzle at the piping position.

Substantially parallel means that the direction between the initial position and the piping position, in which the piping nozzle applicator is movable, and the axial direction of the piping nozzle deviate by a maximum of 25, 20, 15, 10, 5 or 0 degrees.

The nozzle applicator may be arranged to feed pipeable substance to the piping bag after the piping bag nozzle has been brought substantially to the piping position in the piping bag and preferably has been released from the piping nozzle applicator.

According to a third aspect, a piping nozzle applicator is made available for engagement with a piping nozzle or a part thereof, wherein the piping nozzle applicator is provided, at one end, with an engagement part that is able to expand for engagement with the piping nozzle and that is able to contract for release of the piping nozzle.

The expandable engagement part can, for example, be caused to expand by a pressure being applied to the expandable part by means of a push rod located in or insertable into the piping nozzle applicator.

DESCRIPTION OF EMBODIMENTS

Figure 1A:
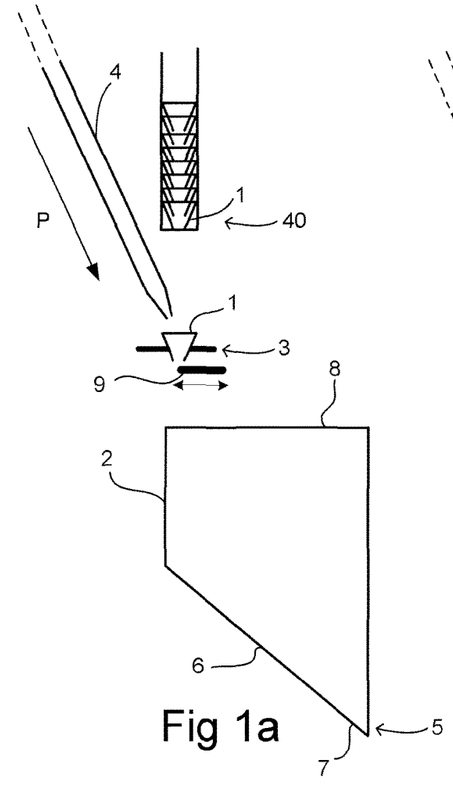
FIG. 1a-FIG. 1d show schematically a device for fitting a piping nozzle in a piping bag during different stages of the method.
Figure 1B:
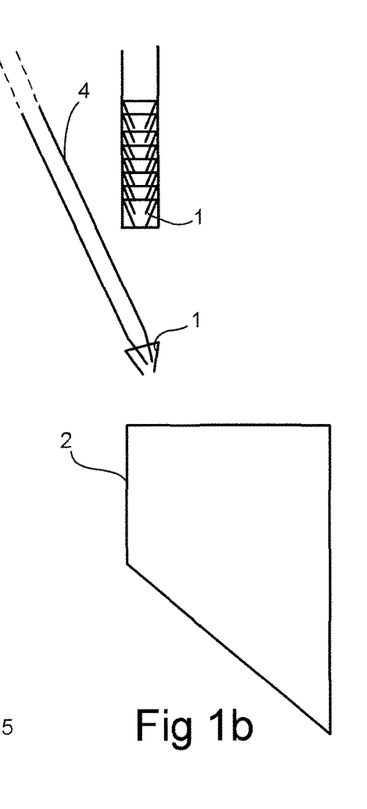
Figure 1C:
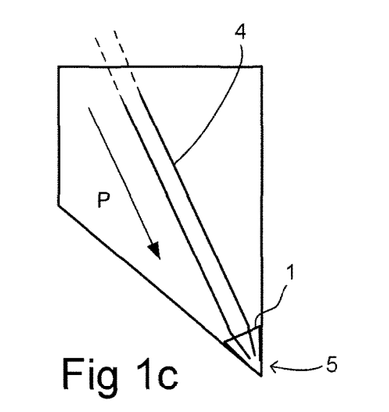
Figure 1D:
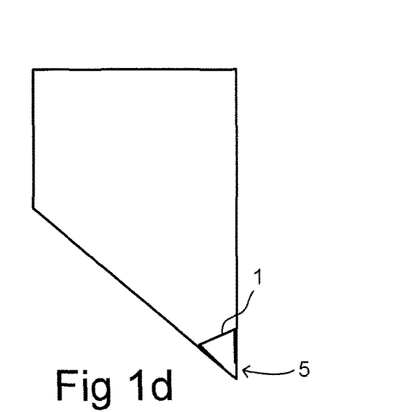

FIG. 1a-FIG. 1d show schematically a device for fitting a piping nozzle 1 in a piping bag 2 during different stages of the method. FIG. 1a show a piping nozzle 1 located in an initial position 3. FIG. 1b shows how a piping nozzle applicator 4 has engaged with a piping nozzle 1, and FIG. 1c shows when the piping nozzle applicator 4 with piping nozzle 1 is in the piping position 5. In FIG. 1d, the piping nozzle 1 has been released from the piping nozzle applicator 4 in the piping position 5, and the piping nozzle applicator 4 has been pulled back from the piping position 5. Thereafter, a new piping bag 2 can be fed forwards, after which the process is repeated.

Figure 2:
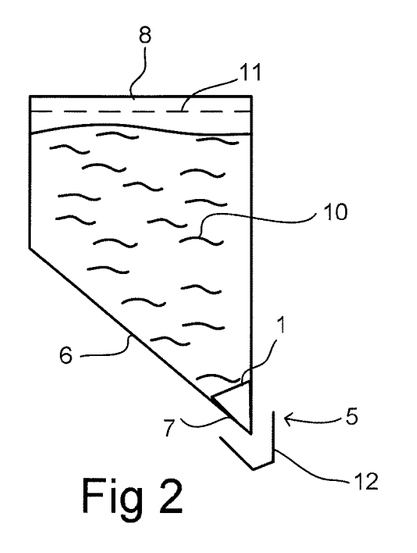
FIG. 2 shows schematically a pre-filled piping bag with a part of a piping nozzle arranged inside it.
Figure 3:
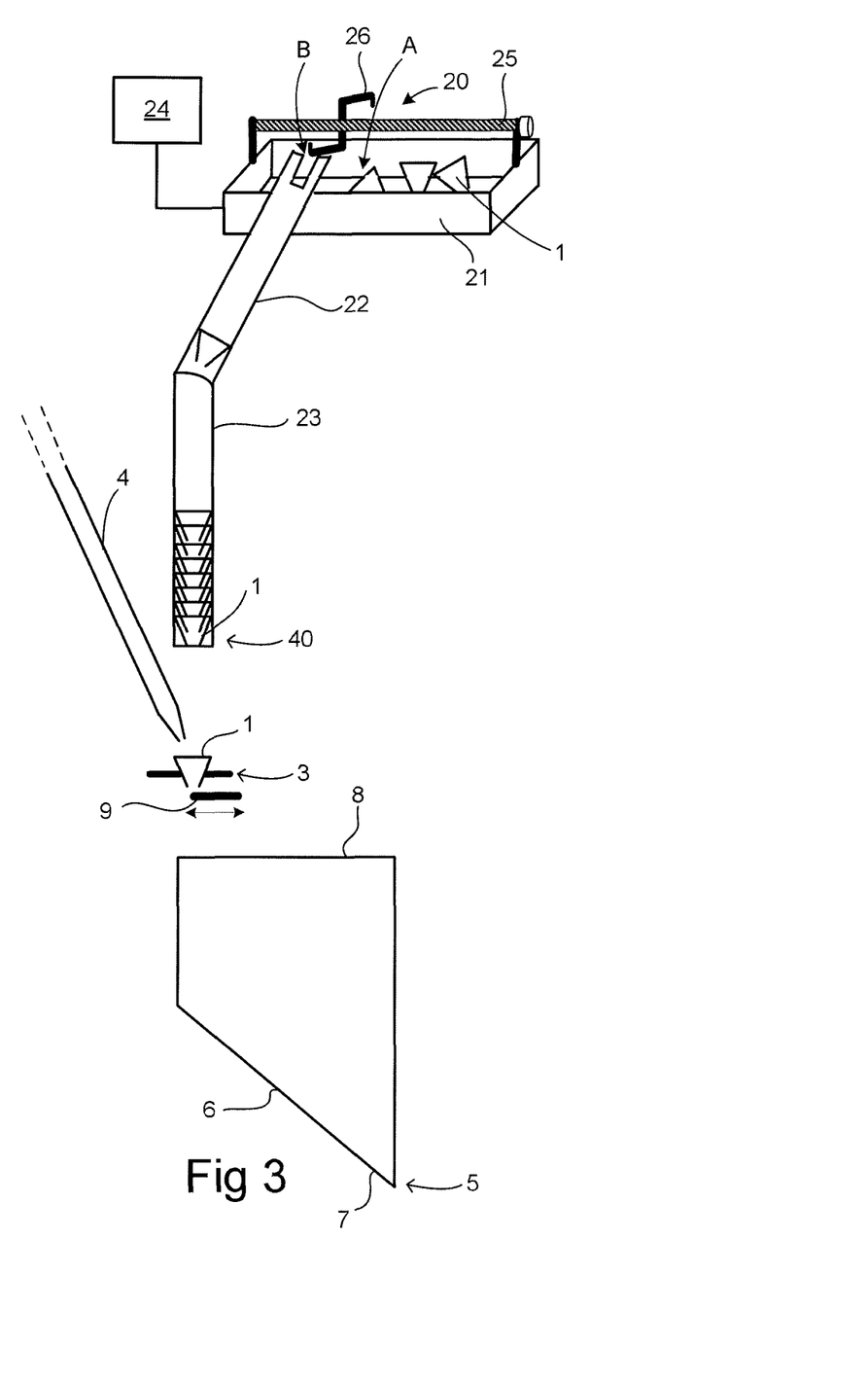
FIG. 3 shows schematically a device according to FIG. 1a-FIG. 1d equipped with a piping nozzle feeder, which feeds piping nozzles one by one to the initial position.

The piping bag 2 shown in FIGS. 1-3 has an inclined portion 6 and two end portions 7, 8. In the one end portion 7, a piping nozzle 1 can be located in its piping position 5 for dispensing pipeable substance 10 from the piping bag 2. In the other end portion 8, the piping bag 2 has a filling opening 8, which is open for insertion of the piping nozzle 1 into the piping bag 2 and for filling the latter with pipeable substance 10 (FIG. 2).

Other types of piping bags 2 not shown in the figures are also possible, e.g. piping bags without an inclined portion. However, a common feature of all types of piping bags 2 is the presence of an end portion 7 for the piping nozzle 1 and an end portion with filling opening 8. During the process of inserting the piping nozzle 1 and during the subsequent filling process, the piping bag 2 can be held and handled as shown, for example, in WO 2007/081272 A1 or WO 2010/054692 A1.

In the embodiment shown in the figures, the piping bag 2 is arranged vertically, with the filling opening 8 directed upwards and the inclined portion 6 directed downwards.

The device can comprise means (not shown) for separating those surfaces of the piping bag 2 that form a portion that is open for filling the piping bag. WO 2011/126453 A1 shows examples of how the bag can be opened.

A piping nozzle 1 is placed in the initial position 3 (FIG. 1a).

The piping nozzle 1 can be brought to the initial position 3 by means of a piping nozzle feeder 20 (FIG. 3 and FIG. 4a-FIG. 4c) which feeds piping nozzles 1 one by one from a container 21 with piping nozzles 1 to the initial position 3 via a receiving unit 22, 23.

Figure 4A:
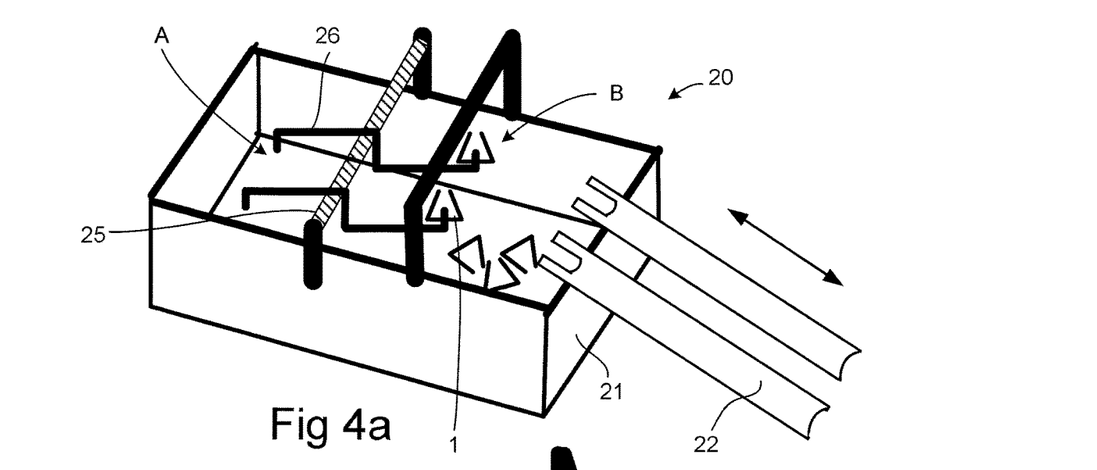
FIG. 4a-FIG. 4c show schematically an embodiment of the piping nozzle feeder and the function thereof.
Figure 4B:
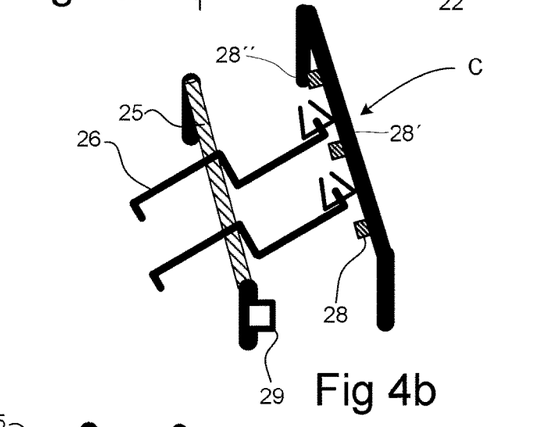
Figure 4C:
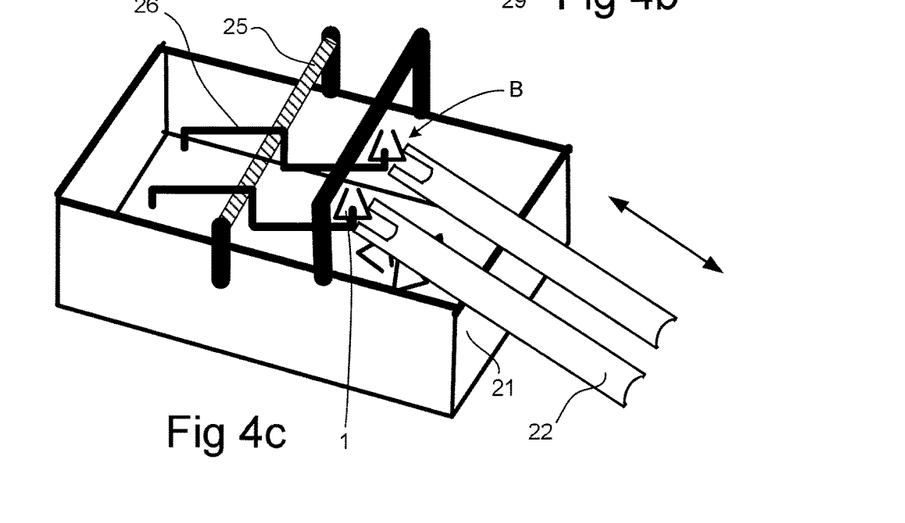

The piping nozzle feeder 20 can comprise a hook 26, which is rotatable about a substantially horizontal rotation axis and projects radially outward from the axis, said hook 26 being designed to pick up a piping nozzle 1 at a first rotation position A, and, at a second rotation position B, to place the piping nozzle 1 in the receiving unit 22, 23.

The piping nozzle feeder 20 can comprise a shaft 25 arranged substantially horizontally above the container 21, on which shaft 25 at least one hook 26 is arranged so as to project in a substantially radial direction.

The hook 26 can have a first portion extending substantially radially relative to the shaft, and a second portion which, relative to a distal part of the first portion, extends substantially tangentially relative to the shaft.

In one embodiment, the shaft 25 is provided with two or more hooks 26 arranged at a distance from each other along the longitudinal direction of the shaft 25. In one embodiment, two or more radially projecting hooks 26 can be arranged at a distance from each other about a circumference of the shaft 25. The hook 26 can also be arranged to move along the longitudinal direction of the shaft 25.

During rotation of the shaft 25 or rotation of the hook 26 around the shaft 25, the hook 26 can be designed to pick up a piping nozzle 1 (the piping nozzle fastens on the hook 26) from the container 21 in a first rotation position A. When the hook 26 has reached a second rotation position B, the piping nozzle 1 that has been picked up is let go in a receiving unit 22, 23.

In the embodiments shown in the figures, the second rotation position B is situated at a higher vertical level than the first rotation position A.

The piping nozzle 1 can be made to come free from the hook 26 in rotation position B under the effect of the force of gravity on the piping nozzle 1 and is transferred to the receiving unit 22, 23. Alternatively, a piping nozzle 1 can be made to come free from the hook 26 under the effect of a releasing device and is transferred to the receiving unit 22, 23. The releasing device can be, for example, a rake or the like.

The receiving unit 22, 23 can be composed of a sloping chute 22 to which piping nozzles 1 are added and are brought to a storage position 40 near the initial position 3. One piping nozzle 1 can be stored in the storage position 40, or several piping nozzles 1 can be stored in a stacked formation, waiting to be brought to the initial position 3.

The sloping chute 22 can be connected to the storage position 40 via a tube 23, in which the piping nozzles 1 can be stacked.

The sloping chute 22 can be provided with a recess or slit in the longitudinal direction of the chute (FIG. 3, and FIG. 4a-FIG. 4c), through which the hook 26 passes while the piping nozzle 1 is being released from the hook 26.

In one embodiment, the hook 26 rotates from the first rotation position A, past the second rotation position B, without releasing a piping nozzle 1 that has been picked up, and onwards to a third rotation position C (FIG. 4b). In rotation position C, there is at least one sensor 28, 28', 28" (see FIG. 4b) which checks the number of piping nozzles 1 that have been picked up on the hook and detects how the piping nozzle 1 is oriented on the hook 26.

If only one piping nozzle 1 has been picked up on the hook 26 and is oriented on said hook 26 in such a way that an inlet of the piping nozzle 1 is directed towards a base of the hook 26, the hook is allowed to rotate back to the second rotation position B so that a nozzle 1 that has been picked up can be let go in the receiving unit 22, 23 (FIG. 4c).

By contrast, if there is no piping nozzle 1 on the hook 26, or if there are several piping nozzles 1 sitting on the hook 26 in the wrong orientation, the hook 26 is not allowed to rotate back to rotation position B and instead continues to rotation position A in order to place the piping nozzle 1 in the container 21 and pick up a new piping nozzle 1.

In FIG. 4a-FIG. 4c, the second rotation position B is situated at a higher vertical level than the first rotation position A, and the third rotation position C is situated at a higher vertical level than the second rotation position B.

In one embodiment, the second rotation position B and the third rotation position C can be at the same vertical level.

The sensor 28, 28', 28" checking the number of piping nozzles 1, and their orientation on the hook 26, sends a signal to a control unit 29 (FIG. 4b) to indicate that the hook is either to be allowed to rotate back to rotation position B or is to continue to rotation position A.

In the embodiments in which the shaft 25 is provided with more than one hook 26 along the longitudinal direction of the shaft 25 or is provided with one hook 26 which is movable along the shaft 25, several receiving units 22, 23, comprising a corresponding number of chutes 22 with associated vertical tubes 23, can be arranged near the second rotation position B of the hooks 26.

In one embodiment, the receiving unit 22, 23 can be movable or can comprise a movable part which is brought towards the second rotation position B when the hook 26, with a piping nozzle 1 that has been picked up, is on its way towards or is located in the second rotation position B.

The movable receiving unit 22, 23, or the movable part of the receiving unit 22, 23, can be movable horizontally and/or vertically.

The container 21 with the piping nozzles 1 can be inclined or can be provided with an inclined base, in such a way that the piping nozzles 1 are gathered in an area of the container 21 where they are able to be picked up with the hook 26.

In an alternative embodiment, pre-stacked piping nozzles 1, stacked one inside another in a tube 23, can be introduced into the device at the storage position 40 instead of the piping nozzles 1 being placed in a container 21 and picked up from there.

From the storage position 40, a piping nozzle 1 is brought to the initial position 3. This can be done in various ways, e.g. by the tube 23 with the piping nozzles 1 being brought from the storage position 40 to the initial position and being allowed there to release a piping nozzle 1 before the tube 23 is moved back to the storage position 40 again, by a piping nozzle 1 being released from the storage position 40 and, under the effect of gravity, being brought to the initial position 3, or by a piping nozzle container located in the initial position 3 being brought to the storage position 40, where it picks up a piping nozzle 1, and then returning to the initial position 3.

A piping nozzle can be secured in the tube 23, for example by means of a movable pin or spike (not shown), which can be drawn aside to allow a piping nozzle 1 to leave the tube 23.

In the figures, the storage position 40 is placed at a certain distance from the initial position 3.

In an alternative embodiment, the storage position 40 and the initial position 3 coincide.

The piping nozzle 1 is secured in the initial position 3 until a piping nozzle applicator 4 engages with it and frees it from the initial position 3.

For example, an O-ring (not shown) can be arranged at the initial position 3 in order to secure the piping nozzle 1 in the initial position 3. The O-ring can be chosen in relation to the type of piping nozzle 1 that is to be fed, preferably such that the O-ring has a hole with a diameter slightly smaller than the greatest diameter of the piping nozzle 1, so that the piping nozzle 1 cannot fall through the hole under its own weight. The difference between the diameter of the hole and the greatest diameter of the O-ring is chosen in relation to the force that can be exerted on the piping nozzle 1 by the piping nozzle applicator 4.

A number of alternatives to the O-ring are conceivable, for example one or more elastic lips, spring-loaded heels or the like. It is also possible for the outlet part at the lower area of the initial position 3 to be made substantially stiff, with the elasticity of the piping nozzle 1 being used to bring about the same function.

At the initial position 3, in another alternative (see FIG. 1a and FIG. 3a), a movable pin or spike 9 is located which in one position holds a piping nozzle 1 in the initial position 3 and which can be drawn aside when the piping nozzle applicator 4 has engaged with the piping nozzle 1.

The initial position 3 can be located outside the piping bag 2, as is shown in FIGS. 1a and 3, or it can be located in the piping bag 2 (not shown) between a portion 8 of the piping bag, where it is open for filling, and the piping position 5.

A piping nozzle 1 at the initial position 3 can be oriented relative to the piping nozzle applicator 4 such that an inlet of the piping nozzle 1 is directed towards the piping nozzle applicator 4.

A piping nozzle applicator 4 engages releasably with the piping nozzle 1 at the initial position 3 (FIG. 1b). The piping nozzle applicator 4 can be an elongate member in the form of a lance, a spear, a rod or the like and is provided, at one end, with means for engaging with a piping nozzle 1 in a releasable manner.

The piping nozzle applicator 4 can be a linearly, hydraulically, electrically or pneumatically driven actuator.

The piping nozzle applicator 4 can be provided with a telescopic function.

The piping nozzle applicator 4 engages with the piping nozzle 1 in the initial position 3 sufficiently firmly to prevent the latter from accidentally coming loose from the piping nozzle applicator 4 during transport from the initial position 3 to the piping position 5 in the piping bag 2.

The piping nozzle applicator 4 can engage with the piping nozzle 1 in the initial position 3 by means of a resilient member, an expandable part, grip claws, a vacuum, or a friction-enhanced surface of the piping nozzle applicator 4. A friction-enhanced surface of the piping nozzle applicator 4 can be a result of a surface structure, an adhesive surface layer, etc.

As another alternative, protrusions, ridges, depressions or grooves may be provided around an inside and/or outside of the piping nozzle opening. Corresponding protrusions, ridges, depressions or grooves may be provided around an outside and/or inside of the end of piping nozzle applicator, as the case may be.

As yet another alternative, a snaplock may be provided on the piping nozzle applicator 4.

Figure 5A:
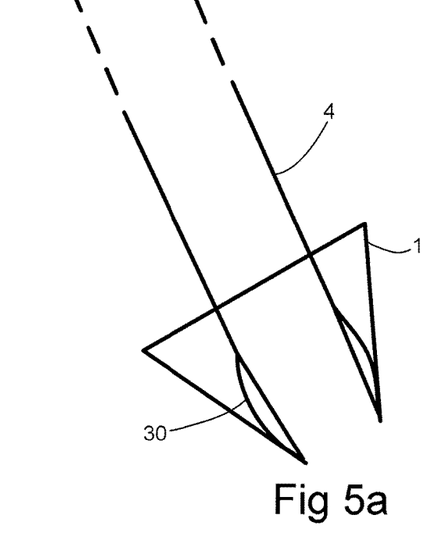
FIG. 5a and FIG. 5b show schematically a piping nozzle applicator which is provided, at one end, with an engagement part that is able to expand for engagement with a piping nozzle and that is able to contract for release of the piping nozzle.
Figure 5B:
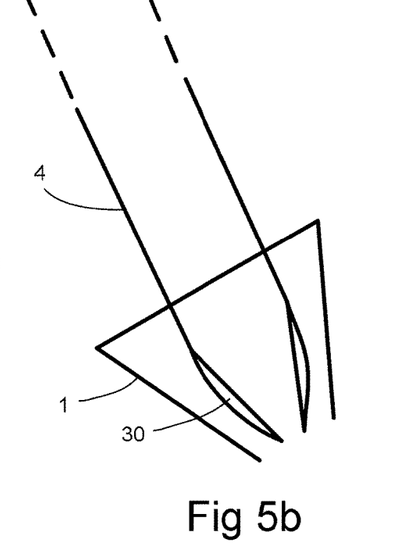

FIG. 5a and FIG. 5b show a piping nozzle applicator 4 which, at one end, is provided with an engagement part 30 which is able to expand for engagement with a piping nozzle 1 and is able to contract for release of the piping nozzle. The expandable engagement part 30 can, for example, be caused to expand by a pressure being applied to the expandable part by means of a push rod located in or insertable into the piping nozzle applicator 4.

The piping nozzle applicator 4 then brings a piping nozzle 1, with which the piping nozzle applicator 4 has engaged, from the initial position 3 to or close to the piping position 5 in the piping bag 2 (FIG. 1c). The piping nozzle applicator 4 in each case brings the piping nozzle 1 so close to the piping position 5 that the piping nozzle 1 cannot be turned or moved and become wrongly oriented when the bag 2 is then filled with pipeable substance 10.

The piping nozzle applicator 4 can be movable between an initial position 3 and a final position 5. In one embodiment, the piping nozzle applicator 4 is movable along its longitudinal direction P.

The longitudinal direction P of the piping nozzle applicator 4 can be substantially parallel to a longitudinal axis of the piping nozzle 1 when the piping nozzle 1 is located in the initial position 3.

The angle between the longitudinal direction P of the piping nozzle applicator 4 and the longitudinal axis of the piping nozzle 1 is a maximum of 25, 20, 15, 10, 5 or 0 degrees.

The piping nozzle applicator 4 can be movable between the initial position 3 and the piping position 5 in a direction that is substantially parallel to an axial direction of the piping nozzle 1 at the piping position 5.

Substantially parallel means that the direction between the initial position 3 and the piping position 5, in which the piping nozzle applicator 4 is movable, and the axial direction of the piping nozzle 1 deviate by a maximum of 25, 20, 15, 10, 5 or 0 degrees.

In order to precisely set the path of the piping nozzle applicator 4 for a specific type of piping bag 2, it is possible to use a linear actuator and sensor. The movement of the piping nozzle applicator 4 between the initial position 3 and the piping position 5 can also be pre-programmed so as to be able to easily change between piping bags 2 of different size or shape.

When the piping nozzle 1 reaches the piping position 5, the piping nozzle 1 is wedged securely against walls of the piping bag 2 and is thus located in the desired position and orientation for piping, and it is then released from the piping nozzle applicator 4 (FIG. 1*d*), after which the piping nozzle applicator 4 is pulled back from the piping position 5.

The piping nozzle 1 can be released from the piping nozzle applicator 4 by the effect of friction, which arises between the piping nozzle 1 and the piping bag 2 in the piping position 5, or by a shape effect.

For example, the piping nozzle 1 can be provided with barbs which ensure that, when the piping nozzle 1 reaches the piping position 5, it does not follow the piping nozzle applicator 4 when the latter is pulled back from the piping position 5.

An outer part of the piping nozzle applicator 4 can function as an abutment for the piping nozzle 1 when the piping nozzle applicator 4 is pulled back.

The method shown in FIG. 1*a*-FIG. 1*d* is a simple and reliable way of ensuring that the piping nozzle 1 reaches a desired position and orientation in the piping bag 2.

Thereafter, the piping bag 2 can be filled with pipeable substance 10 and is ready to be sealed, for example by welding or gluing in a manner known to a person skilled in the art.

The piping bag 2 can be filled with pipeable substance 10 immediately after the piping nozzle 1 has been placed in the piping bag 2, when the piping bag 2 is located in the same position as for insertion of the piping nozzle 1. Alternatively, the piping bag 2 can be brought to another location for filling with pipeable substance 10.

FIG. 2 shows a piping bag 2 which is filled with pipeable substance 10 and which has been provided with a seal 11 that can be in the form of a weld seam. A piping nozzle 1 is located in the piping position 5, in this case simply the female part of a piping nozzle 1 designed for engagement with the nozzle on the outside of the piping bag, which then constitutes a male part 12.

The piping nozzle 1 can alternatively be a complete piping nozzle.

In one embodiment, the piping nozzle applicator 4 can be used to feed pipeable substance 10 into the piping bag 2 after the piping nozzle applicator 4 has first of all brought the piping nozzle 1 to or close to the piping position 5 in the piping bag 2 and has released it there. The release of the piping nozzle 1 from the piping nozzle applicator 4 at the piping position 5 can then take place as has been described above or by means of the effect of the pipeable substance 10. The piping nozzle applicator 4 can be driven in the ways that have been described above or can be driven by the pipeable substance 10.

Release of the piping nozzle from the piping nozzle applicator may, as an alternative, be achieved by the pipeable substance, once it has reached a predetermined position and/or a predetermined pressure, activates a release mechanism.

As yet another option, the pipeable substance may simply bring the piping nozzle when it is being fed. For example, the piping nozzle may provide a constriction at the end of the piping nozzle applicator, and the piping nozzle may be retained at the end of the piping nozzle applicator by means of e.g. a frictional force, such that it may be released once the pressure against it reaches the predetermined pressure.

An aseptic system 24 (FIG. 3), e.g. a UV system, can also be included in the device for the purpose of disinfecting the piping nozzles 1. An aseptic system of this kind can be designed, for example, such that the piping nozzles 1 are disinfected before being placed in the container 21. It is also possible to configure an aseptic system 24 which, for example, disinfects the piping nozzles 1 as they pass through the sloping chute 22 or the vertical tube 23.

The invention claimed is:

1. A device for fitting a piping nozzle or a part of a piping nozzle in a piping bag, comprising:
   a piping nozzle applicator, which is movable between an initial position and a final position, wherein the piping nozzle applicator is designed for releasable engagement with the piping nozzle in the initial position,
   wherein the piping nozzle applicator is also designed to bring the piping nozzle from the initial position substantially to a piping position in the piping bag and, at the piping position, to release the piping nozzle from the piping nozzle applicator, which piping position coincides with said final position of the piping nozzle applicator,
   wherein the initial position is located outside the piping bag or in the piping bag between a portion of the piping bag where it is open for filling and the piping position, wherein the piping position is a position in the piping bag from which, during use, piping substance leaves the piping bag through the piping nozzle, and wherein the piping nozzle applicator is movable between the initial position and the final position along its longitudinal direction.

2. The device according to claim 1, wherein the piping nozzle applicator is an elongate member, which, at one end, is configured to releasably engage with a piping nozzle.

3. The device according to claim 2, wherein the elongate member is chosen from a group comprising a lance, a spear, a rod, or the like.

4. The device according to claim 2, wherein the piping nozzle applicator is configured to releasably engage with the piping nozzle by any one of a resilient member, an expandable part, grip claws, a vacuum, protrusions, ridges, depressions or grooves provided around an inside or outside of the piping nozzle applicator, a snaplock, or a friction-enhanced surface of the piping nozzle applicator.

5. The device according to claim 1, wherein the longitudinal direction of the piping nozzle applicator is substantially parallel to a longitudinal axis of the piping nozzle when the piping nozzle is located in the initial position in the piping bag.

6. The device according to claim 1, wherein the piping nozzle applicator is movable between the initial position and the final position in a direction that is substantially parallel to an axial direction of the piping nozzle at the final position.

7. The device according to claim 1, wherein the piping nozzle applicator is arranged to feed pipeable substance to the piping bag after the piping bag nozzle has been brought substantially to the piping position in the piping bag and has been released from the piping nozzle applicator.

8. The Device according to claim 1, wherein the axial direction of the piping nozzle, in the piping position, is non-parallel with a vertical direction.

9. A System comprising:
   a piping bag; and
   a device for fitting a piping nozzle or a part of a piping nozzle in the piping bag, wherein the device comprises:
   a piping nozzle applicator, which is movable between an initial position and a final position, wherein the piping nozzle applicator is designed for releasable engagement with the piping nozzle in the initial position, wherein the piping nozzle applicator is also designed to bring the piping nozzle from the initial position substantially to a piping position in the piping bag and, at the piping position, to release the piping nozzle from the piping nozzle applicator, which piping position coincides with said final position of the piping nozzle applicator, wherein the initial position is located outside the piping bag or in the piping bag between a portion of the piping bag where it is open for filling and the piping position, wherein the piping position is a position in the piping bag from which, during use, piping substance leaves the piping bag through the piping nozzle, and wherein the piping nozzle applicator is movable between the initial position and the final position along its longitudinal direction.

* * * * *